United States Patent Office 3,440,895
Patented Apr. 29, 1969

3,440,895
TOROIDAL RACE TRANSMISSION UNITS
Thomas George Fellows, London, England, assignor to National Research Development Corporation, London, England, a British corporation
Filed Aug. 31, 1967, Ser. No. 664,661
Claims priority, application Great Britain, Sept. 12, 1966, 40,702/66
Int. Cl. F16h 15/08, 15/16
U.S. Cl. 74—200                                 7 Claims

ABSTRACT OF THE DISCLOSURE

A variable ratio transmission unit of the rolling friction toroidal race type with two sets of rollers providing parallel paths interconnecting two pairs of toroidal surfaces of coaxial discs the torque reactions of the rollers being applied to separate thrust rings one for each set of rollers, the thrust rings being rotatable about the main axis for ratio changing and individually displaceable radially by small amounts for roller-to-roller load equalisation. A first one of the thrust rings for one set of rollers is mounted on a sleeve extending to the vicinity of the other set of rollers and a second of the thrust rings, for that other set of rollers is journalled on the sleeve in the said vicinity. The sleeve, in the said vicinity has a lever extending in one direction radially of the main axis and the second thrust ring has another lever extending in the opposite radial direction. The levers have outer connecting points which lie on a line normally intersecting and substantially normal to the main rotational axis for the toroidally surfaced discs. Hydraulic actuators are connected one to each of these outer connection points by swingable push/pull rolls. The actuators are cross-connected, the "top" of one to the "bottom" of the other and fluid lines from the control system communicate with these cross-connections respectively. The actuators turn the levers in unison for ratio control but permit differential motions of the levers for load-equalising ratio changes as between the two sets of rollers.

Figure 1:
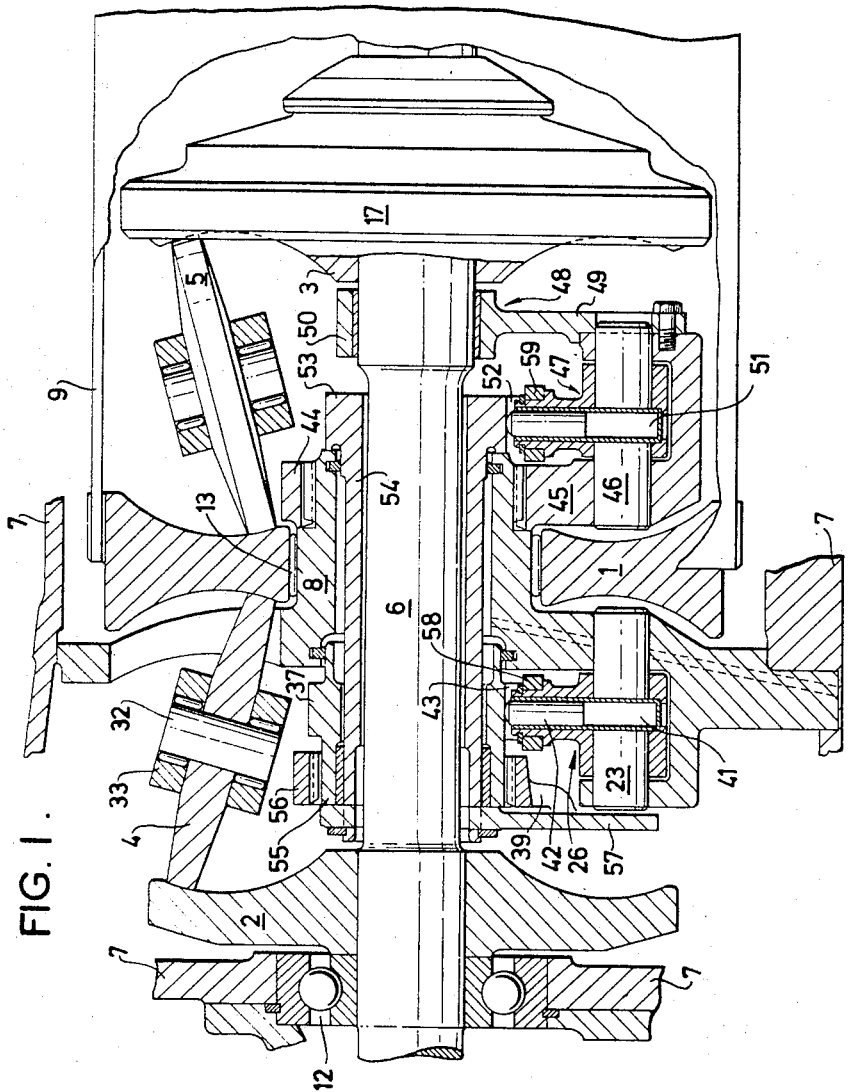

At least one of the fluid lines may contain a damper as per U.S. patent specification 3,327,545.

The thrust rings may both have dampers as per U.S. patent specification 3,306,119 for their radial roller-to-roller equalising moments.

Stop limbs connected to the actuator piston rods make contact short of each end of the range of differential motion of the actuators leaving a small residue of motion possible for the actuators after the limbs make contact, so as not to interfere with roller load equalisation.

---

This invention relates to variable ratio transmission units of the so-called "rolling friction" type having coaxial input and output discs with facing toroidal surfaces between which tiltable rollers provide a driving connection.

The invention has particular relevance to transmission units of the said type in which the rollers are mounted, not only with freedom to rotate about their rolling axes, but also with freedom of movement of a first character permitting the diameters of the tracks on the discs, with which the rollers make driving contact, to be varied so as to vary the transmission ratio of the transmission unit and with freedom of motion also of a second character whereby the rolling axes of the rollers depart from the stable equilibrium attitude where such axes intersect the common rotational axis of the discs (hereinafter called the "main axis"), so that the rollers steer themselves from one ratio attitude to another ratio attitude, undergoing motions of the first character in the process.

It is known for the roller mountings to be arranged so that the driving torque reactions of the rollers are at least partly applied to spaced-apart thrust receiving points on a common thrust receiving member which, on rotation about the main axis causes the rollers, in unison, to undergo motions of the second character but is additionally capable of motion in any direction radial of the main axis which causes the rollers to undergo motions of the second character which are unequal in degree and/or opposite in sense, in response to inequalities in the thrusts arising at the rollers and applied to the said thrust receiving points whereby the rollers may change ratio individually but in a differential manner, in directions tending to equalise these thrusts and thus to ensure that the driving loads passing through the transmission unit are shared equally between the rollers.

To enable the rotary motion of the common thrust receiving member to be controlled without interfering with its freedom to undergo the said radial motions for load equalisation it is known to employ a differential linkage connected to points on a lever or the like connected to the common thrust receiving member, which points lie diametrically opposite to one another in relation to the main axis, such linkage being of the type which can be controlled to apply tangential thrusts in opposite directions to the said two points but so as to permit the two points to move in the same direction without restraint by the linkage.

The two points may be on the ends of levers or the like, extending in opposite directions outwardly from the main axis and connected to the common thrust receiving member and the said forces act in directions parallel to one another and preferably normal to a line joining the two points at one position in the permitted range of movement of the levers.

A preferred form for the common thrust receiving member is a central ring member disposed around the main shaft, with radially extending slots symmetrically spaced around its periphery and each slot receives the inner branch of a rocker lever for one of the rollers. These rocker levers are coupled to the roller carriers and when they are displaced in unison on rotation of the ring member the rollers are caused in unison to initiate ratio chances. The geometry of such a construction is explained in detail in U.S. Patent No. 3,153,938.

The description down to this point has related to a single set of rollers providing a driving connection between two facing toroidal surfaces on two coaxial discs respectively. It is well-known to provide two sets of rollers each set providing a driving connection between a pair of facing toroidal surfaces on coaxial discs, each surface of one pair being coupled to rotate with a surface of the other pair so that the two pairs of surfaces and the sets of rollers respectively engaging them are operationally in parallel for the transmission of torque through the transmission unit. The most common arrangement is for a centre disc to have toroidal surfaces on both sides, and for two outer discs, coupled by a main shaft passing through the centre disc, to have a toroidal surface on each, which faces one of the surfaces of the centre disc, all discs being coaxial and the two outer discs being the input members of the transmission unit and the centre disc the output member or vice versa. Such a transmission unit is hereinafter called a "parallel double-ended transmission unit."

It is important that the two sets of rollers in a parallel double ended transmission unit should share the driving loads equally between them and it is known to couple together two common thrust receiving members, one associated with each set of rollers and to arrange that the assembly of common thrust receiving members is capable of motion in a third mode which initiates differential ratio changes as between the two sets of rollers, in response to any inequality between the thrusts applied by the two sets of rollers to their respective common thrust receiving members, whereby the more highly loaded set of rollers assumes a lower ratio and the less highly loaded set of rollers assumes a higher ratio, until the loads are equalised as between the two sets of rollers. For the purposes of this specification the ratio of the transmission unit is expressed in terms of output speed/input speed, so that a low ratio is one in which the output speed is lower than the input speed and a high ratio vice versa.

With the preferred form of thrust receiving member referred to above namely a ring with radially-extending slots, it is known to slant each of the slots at an angle to the plane passing through the slot and containing the main axis. The two rings are connected to the ends of a tube threaded over the main shaft and passing, (with clearance inside and outside), through the middle of the centre disc.

The slants of the slots as between the one ring and the other, are of opposite hand so that the required load equalisation between the two sets of rollers is attained by axial movement of the assembly of the two rings and the tube and this axial movement constitutes the motion in the third mode referred to above.

This arrangement has the disadvantage that the friction of the ends of the rocker levers in the slots tends to impede axial movement of the ring-and-tune assembly and may lead to incomplete load equalisation as between the two sets of rollers. This disadvantage is enhanced by the need to restrict the angle of slant of the slots to minimize axial thrusts against the rocker levers.

It is known to mount thrust receiving ring members of the type referred to in such a way that freedom of each to move in directions radial of the main axis is furnished by means of a three-element universal linkage assembly capable of transmitting torque to the ring but not restricting radial motion. One element is an input element firmly journalled in relation to the main axis and coupled to an intermediate element by links which permit the latter to move freely in a first radial direction, the third element being the ring itself which is coupled to the intermediate element by similar links which permit the ring to move freely in a second radial direction at right angles to the first. The firmly journalled elements of the universal linkages for each of the rings are provided with control levers the ends of which are coupled to the ends of a swingletree and the ratio control actuator is coupled to a point on the swingletree between its ends. Load equalisation between the two sets of rollers is provided by swinging of the swingletree about this intermediate point but both rings are controlled in the rotational sense by the said actuator through the swingletree.

This arrangement overcomes the difficulty of securing adequate equalisation as between the two sets of rollers but the universal linkage assemblies are costly and bulky to the extent that they can only with difficulty be accommodated in the required place where space is at a premium. Furthermore the links and their pivots impose a significant frictional restraint to radial motions of the thrust receiving rings thus impairing load equalisation as between the individual rollers of a set.

According to the invention, therefore a variable ratio transmission unit comprises two sets of rollers, each set providing a driving connection between a pair of facing toroidal surfaces on coaxial discs, each surface of one pair of surfaces being coupled to rotate with a surface of the other pair, so that the said two pairs of surfaces and the sets of rollers respectively engaging them are operationally in parallel for the transmission of torque through the transmission unit, a mounting for each roller defining rolling axis about which the roller rotates for the transmission of torque from one disc to another and a precessional axis about which the mounting rotates to change the diameters of the toroidal surfaces at which they are engaged by the roller, to change the transmission ratio, the mounting having freedom of motion in a further mode permitting the rolling axis to move from a stable equilibrium attitude wherein the rolling axis intersects the main axis about which the discs rotate into an attitude in which the rolling axis does not intersect the main axis so that the roller steers itself along a helical path on the discs and changes ratio in the process, the said mounting being urged to move in the second mode by the torque reaction to which it is subjected by the driving action of the roller, a common thrust receiving member for each set of rollers having spaced apart thrust receiving points and a coupling from the mounting of each roller of the set to one of such points the common thrust receiving points being disposed about the main axis so that the thrusts due to roller torque reaction tend to rotate the said members and to displace the said members radially when the torque reactions of the rollers of a set are unequal so that equalising ratio changes are imposed upon the rollers characterised in that a first thrust receiving member for one set of rollers is mounted at one end of a sleeve which extends to the space between the pair of toroidal surfaces engaged by the other set of rollers the sleeve being free to move to a predetermind maximum extent in any direction radial of the main axis at either of its ends, the end of the sleeve remote from the first thrust receiving member being furnished with a first radially extending lever, a second thrust receiving member, for the other set of rollers, journalled on the sleeve in the vicinity of the first lever so as to be freely rotatable thereon but without freedom in relation to the sleeve, radial of the main axis a second radially extending lever, fixed to the second thrust receiving member, and extending in a direction diametrically opposite (relative to the main axis) to the direction in which the first lever extends the first lever and the second lever having outer connection points at equal distances from the main axis and in a line normally intersecting the main axis with means for exerting equal and opposite forces upon the said outer connection points in directions substantially normal to the said line, which forces are equal as between the first lever and the second lever but which means do not restrain movement of the two outer connection points in the same direction in any direction radial of the main axis.

Preferably the said means takes the form of two double-acting fluid pressure operated actuators cross-connected and connected to a source of pressurised fluid, as previously described, the movable elements of each actuator being connected by a universally swingable link to the outer connection point of one of the said levers.

Alternatively the said means may consist of the known type of differential linkage previously referred to, though linkages of this type tend to be bulky and costly.

Figure 2:
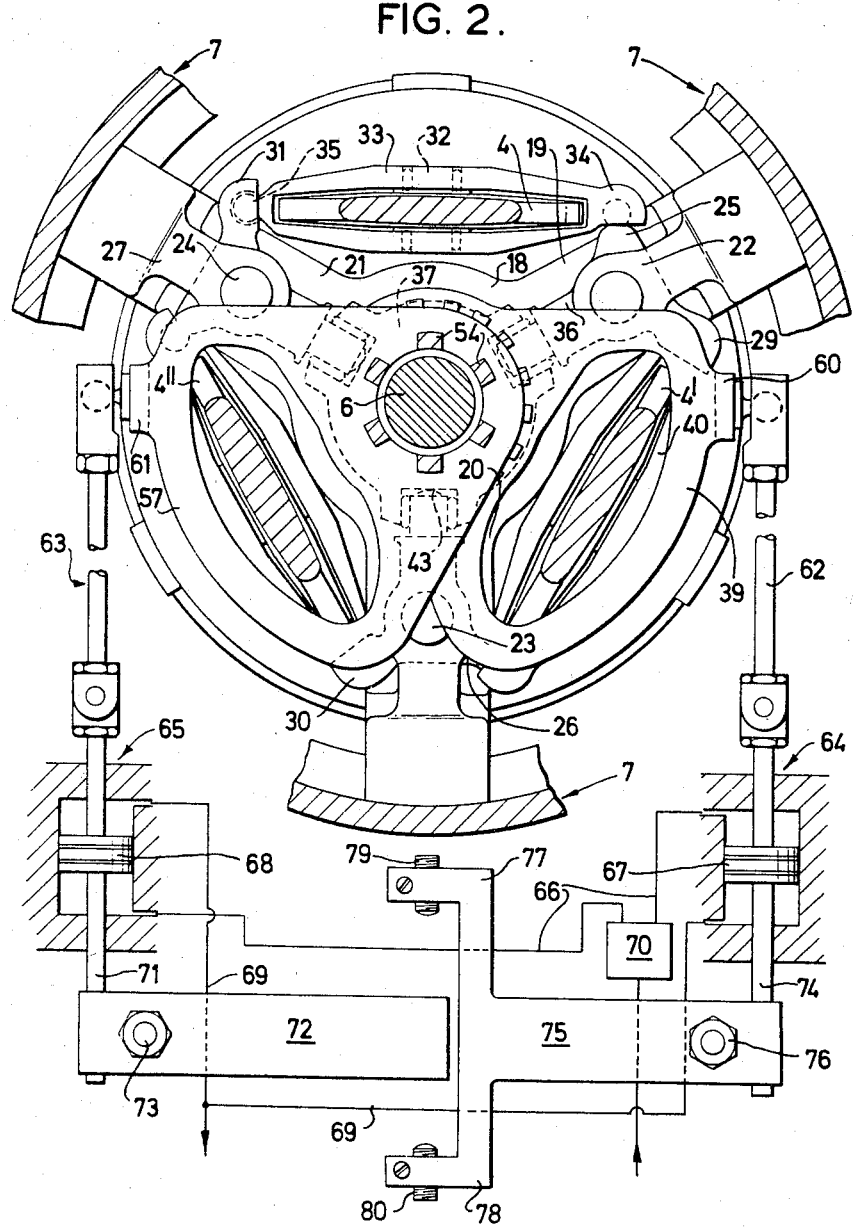

The invention will be more readily understood from the following description of an embodiment thereof which is illustrated in the accompanying drawings in which:

FIGURE 1 is a longitudinal section of a parallel double-ended transmission unit incorporating the said embodiment, and FIGURE 2 is a cross-section of the said embodiment.

In FIGURE 1 a transmission unit according to one embodiment of the invention is shown partly sectioned in a plane containing the axis common to the discs and the input and output shafts (hereinafter called the "main-axis") but certain parts are not sectioned so that the drawing shall not be burdened with detail which is not material to the invention.

This is a parallel double-ended transmission unit having a centre disc 1, with toroidal surfaces on both of its faces, each of these surfaces engaging a set of rollers which provide driving connections respectively to inwardly facing toroidal surfaces on two outer discs 2 and 3 respectively. Only one roller of each set is shown but there are in fact three rollers in each set. Roller 4 of one set is seen to make contact with disc 1 and disc 2 and roller 5 of the other set is seen to make contact with disc 1 and disc 3.

Discs 2 and 3 rotate with a centre shaft 6, supported in bearings in the end walls of the transmission unit casing 7, only one of these bearings being shown at 12.

Disc 1 rotates on needle roller bearings 13 the inner race of which is provided by the outer surface of a sleeve 8 which forms part of a rigid roller-supporting spider assembly anchored to the casing 7. This assembly will be described later.

Disc 1 has castellations on its outer edge which engage notches on the open rim of an output bell member 9. Bell member 9, which encloses disc 3 and the right hand set of rollers exemplified by roller 5, has a closed end which is secured to an output member of the transmission unit, not shown in the drawing.

An end loading device indicated generally at 17, exerts a force to the right on shaft 6 and a force to the left on disc 3. Disc 2 is secured against axial movement along shaft 6 but disc 3 is capable of limited axial sliding along 6, so that discs 2 and 3 are forced together, with the two sets of rollers and disc 1 between them to ensure driving engagement between the rollers and the toroidal surfaces of the discs.

Devices of this type are well known in the art and it is not necessary to describe the one indicated at 17, which may take any one of a number of known forms.

The roller support assembly can best be described with reference to FIGURE 2 which is a transverse section of the transmission unit of FIGURE 1 looking from the left, with disc 2 removed to reveal what lies behind it.

A central tubular boss 18 is integral with sleeve 8 and forms part of the left hand component of the said rigid spider assembly. Boss 18 is integral with three radially divergent spider arms 19, 20 and 21. These spider arms have near their outer ends, spider pins 22, 23, 24 extending parallel to the main axis and in the direction of disc 2. These pins provide fulcrum pivots for three bell crank rockers 25, 26 and 27 respectively. Each rocker has a second branch (29, 30 and 31 respectively for rockers 25, 26 and 27).

The rollers are all similarly mounted and these mountings will be described in relation to roller 4. Roller 4 is fast with an axle pin 32 supported for rotation in roller bearings located at the centre of a roller carrier 33 which extends across the outer and inner surfaces of roller 4 and is further extended at each end to embrace the tread of the roller and at the right-hand end to provide a part-spherical socket 34 and at the left-hand end a ball-shaped projection 35. Socket 34 receives a spherical end of rocker 25 and projection 35 is received in a cylindrical bore of branch 31 or rocker 27.

The inwardly extending leg 36, of rocker 25 engages (by means of components to be described later), a slot in thrust receiving ring 37.

Let it be assumed that the disc 2 normally rotates clockwise in relation to FIGURE 2. When the input shaft is transmitting torque through the transmitting unit to he ouput shaft, the torque reaction against the roller supports will also act in clockwise sense, and in the case of roller 4 this will be from left to right in FIGURE 2. The three rollers of the set will therefore tend to turn common thrust receiving member 37 in an anticlockwise direction but the control linkage (to be described below) will resist, or control, this tendency.

A roller is in equilibrium at a certain ratio when its rotational axis intersects the main axis and if the roller is tilted so that this is not so it will steer a spiral course across the faces of the discs such as to change its ratio angle; for instance if the axis of roller 4 is displaced to the right( as seen in FIGURE 2) the roller will steer towards a lower ratio of output speed:input speed. Ratio changes are initiated by rotating thrust receiving ring 37 about the main axis, through the said control linkage, by a control member external to the rotating assembly of the transmission unit and this control member may be part of a servo loop adapted to arrest the ratio change in response to a feed-back signal dependent on desired performance criteria for the installation served by the transmission unit (e.g. output speed, input speed, or the ratio between these, and/or input torque or output torque). A roller displaced from its equilibrium attitude will continue to change ratio indefinitely if its ratio axis (e.g. in the case of roller 4, the line intersecting the centres of spherical socket 34 and projection 35 and the roller centre) lies in the plane of the circle forming the locus of the centre of the circle which is the generator of the facing toroidal surfaces of discs 1 and 2 (hereinafter called the "torus centre circle") and with this geometry, (hereinafter called "neutral camber angle" geometry), reliance is placed on the control servo loop to restore the roller to its original equilibrium position when the ratio has changed to the required extent.

In an alternative geometry the roller ratio axis is canted out of the plane of the torus centre circle in the plane containing the roller running track, through a small angle called a "camber angle" so that, when the roller rotates about this displaced ratio axis, its axis of rotation (i.e. the axis of axle pin 32) has a component of rotation in the plane of the torus centre circle so that the roller will reach a ratio equilbrium at a certain ratio dependent on the attitude of its rocker. With camber angle geometry the demand member of the ratio control system need not of necessity be controlled by a servo loop, and may be movably (by hand, for instance) to different positions, each of which will produce a definite ratio for the transmission unit.

Yet another alternative ratio control geometry, similar in operation to camber-angle geometry, (and hereinafter called "tilt-cancelling" geometry), is one in which, though the roller ratio axis lies in the plane of the torus centre circle, the coupling between the roller and the member (such as a rocker) through which it is initially displaced from ratio equilibrium, is such as to displace the roller in relation to the said member, when a ratio angle motion takes place, in a sense such as to bring the axis of the roller axle pin again into intersection with the main axis, though the said member retains the displacement which initiated the ratio change. One way of achieving this is to replace the ball and socket coupling between rocker and roller, as shown in FIGURE 2, with a screw and nut assembly coaxial with the ratio axis.

Whether neutral camber angle geometry, camber angle geometry or tilt cancelling geometry is adopted the means, now to be described, whereby the rollers are automatically adjusted to equalise their shares of the driving load, is substantially the same.

The thrust receiving ring 37, though restrained in respect of rotation about the main axis by the said control linkage, is free to move to a limited extent in any direction radial of the main axis and its location in such directions is determined by the balance of the torque reaction forces originating at the rollers and applied to it by the inwardly extending legs of the rockers 25, 26 and 27.

These torque reaction forces operate in directions normal to the centre lines of these inwardly extending arms of the rockers, that is to say tangential to the circle passing through the three thrust receiving points where the tips of the rocker arms make effective contact with the slots of he common thrust receiving member which receive them. If one roller is taking more than its fair share of the driving load it will convey a larger torque reaction force to the corresponding thrust receiving point than do the other rollers to their corresponding thrust receiving points and in the simple case where those other rollers are equally underloaded the common thrust receiving member will shift over bodily in a direction of the tangent, at the thrust receiving point associated with the overloaded roller, to the circle passing through the three thrust receiving points. The result of this shift-over of the common thrust receiving member is that the rockers of the underloaded rollers are turned in a sense such as to initiate ratio changes towards a higher ratio, on the part of the underloaded rollers. With camber angle and tilt cancelling geometry, the thrust receiving ring will remain displaced, other things being equal, but with neutral camber angle geometry the common thrust receiving member will move back towards some neutral position (which will be constant for any particular overall ratio of the transmission) as the rollers change ratio to equalise their shares of the driving load.

It is possible in certain circumstances for the load-equalising operation of the torque receiving rings and the rollers to oscillate.

It has been found that frictional restraint of bodily movement of the thrust receiving ring will inhibit oscillation in many practical applications and U.S. Patent No. 3,203,267 describes methods of applying such frictional restraint. This frictional restrain degrades the equalisation performance of the transmission unit however, since the forces acting on the thrust receiving ring fall as the equalised condition is approached and a point is reached short of accurate equalisation, where the forces are insufficient to overcome the friction of the restraining means.

An extensive analysis of the mechanism of this oscillation has led to the conclusion that it can effectively be inhibited by viscous damping of the load equalisation motions of the thrust receiving ring but it is undersirable that other modes of motion of the thrust receiving ring should be restrained by the damping means. For instance, in the case of the embodiments of the invention herein described, the rotational motion of the thrust receiving ring about the main axis should not be affected by the damping.

In many applications for a transmission unit of this type a sensitive servo control system is required which will generate control forces instantly, in response to fluctuations in torque. If the reaction to a change of torque is delayed by damping means the response of the servo system to the change of torque will be similarly delayed and this will frequently upset the performance of the control system; particularly where the control force of the servo system is utilised to energise end loading device such as device 17.

The manner in which these requirements are met, in the said embodiment of the invention, will now be described, in relation to FIGURES 1 and 2.

The arrangement of FIGURE 1 lends itself either to neutral camber angle geometry or camber angle geometry. Ratio control of the rollers of one set is achieved by rotating the thrust receiving ring 37 by means of a lever 39 which takes the form of a sector having a window 40 to avoid the lower right-hand roller 41.

Radial oscillations of thrust receiving ring 37 are damped by means of fluid filled dashpots such as dashpot 41 housed within the rocker lever 26 and aligned radially of the main axis. Dashpot 41 is shown diagrammatically in FIGURE 1. It may take the form shown in FIGURE 2B of the drawings accompanying U.S. Patent No. 3,306,119 or alternatively it may be of the sealed type. The piston element 42 of dashpot 41 bears against the bottom of slot (thrust receiving point) 43 of thrust receiving ring 37 which is indicated in dotted lines in FIGURE 2. Similar dashpots are provided for the other two rockers 25 and 27 and, though they are only single-acting, between them they damp motions or ring 37 in any radial direction. The rollers, such as 5, of the right-hand set of rollers are mounted in similar fashion to roller 4.

The sleeve 8, integral with the left-hand spider, whose legs 19, 20 and 21 support the rollers of the left-hand set, extends through the middle of centre disc 1 and into the space between discs 1 and 3. The projecting end is splined to receive a correspondingly splined central boss 44 from which project three radial legs (corresponding to legs 19, 20 and 21). Only one of these legs, 45, is visible in FIGURE 1. It is furnished with a pivot pin 46 which carries a rocker 47 similar to the rockers 25, 26 and 27 but oppositely handed so far as its outwardly projecting branches are concerned. A steadying spider 48 has three legs only one of which, 49 can be seen in FIGURE 1. These legs are secured to the outer ends of the spider legs such as 45 and they are joined at their inner ends to a boss 50 which is lined with bearing metal and rides on the main shaft 6.

Rocker 47 and its companion rockers for the right-hand set of rollers (such as 5) are equipped with dashpot dampers such as 51 of similar construction and mode of action to dashpot 41. The inwardly projecting arms of the right-hand rocker (such as 47) engage slots such as 52 (similar to slot 43, of thrust receiving ring 37) of a thrust receiving ring 53 (similar to 37).

Thrust receiving ring 53 is integral with a sleeve 54 which passes within sleeve 8 and through thrust receiving ring 37, a projection of which 55, is lined with bearing metal so as to be journalled on sleeve 54. Projection 55 is splined externally to mate with corresponding splines on a boss 56 which is integral with lever 39.

Tube 54 is extended to the left, beyond extension 55 and is castellated to receive and be secured to, a lever 57 which is a mirror image of lever 39 except that lever 57 is flat whereas lever 39 is cranked to bring its outer parts into the same plane as lever 57, so that it does not foul rocker pins 22 and 23.

The two thrust receiving rings 37 and 53 are capable of making radial excursions independently of one another, for load equalisation between individual rollers of the two sets of rollers respectively. If one moves and the other does not move or moves in the opposite direction, both rings will be rocked out of the planes normal to the main axis. This rocking is of small extent however and does not affect the attitudes of the rollers. The rocker-ends are provided with slippers, such as 58 and 59 which have cylindrical flanks contacting the walls of the slots (such as 43) and which can swivel on the rocker ends. This gives the requisite freedom of motion of the slippers in the slots whilst at the same time providing a satisfactory contact area to avoid excessive wear.

The sleeve 54 and the ring 37 are thus seen to be capable of independent rotation to change the ratios of the two sets of rollers independently but, at the end adjacent to levers 39 and 57, they are constrained to move together in directions radial of the main axis.

To understand the operation of the ratio control arrangements, it is necessary to refer to FIGURE 2.

To change the ratio of the transmission unit as a whole, in one direction, lever 57 has to be pushed up (for the right-hand set of rollers) and lever 39 as to be pulled down (for the left-hand set of rollers), or vice versa for the other direction of ratio change.

Assuming that the direction of torque transmission through the transmission unit is such as to urge the roller mountings in a clockwise direction in relation to FIGURE 2, then the rockers 25, 26 and 27 will urge ring 37 in the anti-clockwise direction and levers 57 and 39 will be urged to swing in the same direction about the main axis. Levers 57 and 39 have outer lugs 61 and 60 which are coupled by ball jointed droplinks 63 and 62 to ratio control actuators 65 and 64 which are illustrated diagrammatically in FIGURE 2. Lugs 61 and 60 are cranked backwards from the viewer of FIGURE 2 so as to be as nearly in the same plane as the bearing at 55 as is possible without fouling the roller carrier of the two lower rollers of the left-hand set of rollers. The turning moments applied to levers 57 and 39 (arising from the torque reaction of the rollers) must be balanced by the forces applied to lugs 61 and 60, through drop-links 63 and 62, by actuators 65 and 64. For the direction of torque transmission assumed above the force from actuator 65 must be upwards and the force from 64 downwards. The lower side of actuator 65 and the upperside of actuator 64 are connected together and to a source of control fluid pressure by conduits schematically indicated as 66. The areas of pistons 68 and 67 of actuators 65 and 64, are equal so that equal and opposite forces are applied to levers 57 and 39 for any given pressure in conduits 66.

If the torque reaction forces at the lugs 61 and 60 are not equal to the forces from actuators 68 and 67 the levers and with them the thrust receiving rings 37 and 53, will rotate and the two sets of rollers will change ratio, altering their torque reaction forces in the process until they are in balance with the actuator-forces. When this balance exists, the torque (anti-clockwise) on ring 37 will tend to pivot lever 57 about lug 61 and, as this point is held stationary by the upward force from actuator 65, ring 37 will be subject to an upward reaction force. Similarly, ring 53, through sleeve 54, will tend to rotate lever 39 anti-clockwise and it will tend to pivot about lug 60, and as this is held by the downward force from actuator 64, the end of sleeve 54 adjacent to ring 37 will be subjected to a downward reaction force. Since ring 37 is journalled on sleeve 54 these two reaction forces balance one another so that there is no net reaction force at ring 37 which is free to move in any radial direction for equalising the loads carried by the three rollers of the left-hand set of rollers.

Should the two sets of rollers be not carrying equal shares of the overall torque transmitted by the transmission unit as a whole then one of the levers 57, 39 will not be in balance with the force applied by the corresponding actuator and it will turn, independently of the other lever, resulting in a ratio change on the part of the set of rollers controlled by the lever which turns, which will persist until the two sets of rollers are again bearing equal shares of the overall torque.

When an unequal sharing of the overall torque, as between the two sets of rollers, first becomes manifest it might appear that the reaction forces at the centres of the two levers would not be in balance so that ring 37 would be radially displaced upwards or downwards resulting in a disturbance of the load equalisation between the individual rollers of the left-hand set of rollers.

Prima facie the reaction forces at the centres of the levers cannot exceed the forces applied by the two actuators and as these forces are equal the reaction forces must be in balance. Conversely, however, if the torque reaction force at one of the levers is less than the actuator force there will be an imbalance of the reaction forces. The lever in question will move under the influence of the actuator but the torque reaction force at the lever will not rise to restore balance until the rollers of the set associated with that lever have made a ratio change.

This temporary imbalance of the reaction forces at the centres of the levers will temporarily upset the equalisation of the left-hand set of rollers but the dampers (such as 41) will resist any sudden radial excursion of ring 37 and they can be given a time constant sufficiently long to bridge the time interval between the onset of any inequality of torque reaction as between the two sets of rollers and its correction by a ratio change.

In the event of oscillation of the load equalisation system as between the two sets of rollers, the two levers 39 and 57 tend to rotate in opposite directions. If the two lugs 60 and 61 are regarded as held firm by the actuators, then the centres of the two levers, and the ring 37, tend to oscillate up and down. This is damped by the dashpots (such as 41) which damp radial excursions of ring 37.

However, the actuators 64 and 65 do not hold firm the lugs 60 and 61 except as oscillation frequencies where the inertia of the relevant moving parts is significant. Due to the cross connection of the actuators by the conduit 66, and by another conduit 69 which similarly interconnects the other sides of the two actuators, the pistons 67 and 68 can move upwards or downwards in unison in the same direction by transference of fluid from one actuator to another. If therefore, the dashpots (such as 41) hold the centres of the levers 39 and 57 steady then the lugs 60 and 61 will oscillate upwards and downwards permitting the two sets of rollers to undergo differential oscillatory ratio changes.

Where a high standard of stability is required, therefore, it is preferable to introduce, into the ducts conveying the fluid to and from the actuators 64 and 65, damping devices of the type described in U.S. Patent No, 3,327,545.

This type of device has a floating piston element having an effective total piston area on the side facing the fluid supply inlet which is equal to the sum of two effective opposing piston areas on the other side of the piston element, these two opposed piston areas working in separate cylinder spaces each of which is connected to one of the actuators; transfer of fluid from one of these two cylinder spaces to the other is resisted by a restrictor orifice. Any sudden change of pressure at the fluid supply inlet is communicated to the two cylinder spaces in equal degree by movement of the floating piston element but any transfer of fluid between the two actuators applies equal and opposite forces on the said two piston areas and the fluid can only be transferred by passage through the restrictor orifice. So that the operation of the device is not defeated by the piston element reaching the ends of its stroke a further restricted passage interconnects the fluid inlet side of the device to the two separate cylinder spaces, and the floating piston element in lightly spring-loaded to a central position.

This device could be inserted in one only of the conduits 66, 64 and FIGURE 2 shows one device (diagrammatically illustrated and denoted 70) in conduit 66. Alternatively, two could be used, one in each conduit.

By suitable matching of the damping dashpots (such as 41) and the damping device (such as 70), the two levers 39 and 57 can be prevented from rotating in opposite directions in an oscillatory manner without impeding such motions when they take place in a stable manner for equalising the loads as between the two sets of rollers.

In a parallel double-ended transmission unit employing camber angle geometry it is frequently desirable to provide means for arresting the motions of the rollers of the second character at the ends of the permissible range of travel, to prevent the rollers from continuing to rotate about their ratio changing axes after they have reached the vicinity of the edges of the toroidal surfaces of the discs and so as to prevent them from running off the said toroidal surfaces. With the known differential mechanical linkage previously referred to it is convenient to place end stops at the extremes of travel of the actuator or the like which acts on the linkage to effect ratio changes. The differential effect of the linkage ensures that the load equalisation between the rollers of the set nearest to the actuation lever, is not disturbed when the end stop is reached.

With twin cross-connected actuators according to the present invention however it is not possible to stop the motions of the actuator piston by means of fixed abutments on the actuator bodies without upsetting the load equalisation between the rollers of one set.

According to a further feature of the invention, therefore, members coupled to the respective actuator pistons make contact with one another when the pistons have made a predetermined degree of motion relative to one another, in either direction of relative motion, whereby further relative motion of the pistons beyond the respective limits set by the said members, at each end of the predetermined range of relative motion of the pistons, is prevented. This is illustrated diagrammatically in FIGURE 2 where the piston rod 71, for piston 68, has a bar 72 secured to its lower end by means of a pinch bolt 73. The piston rod 74 of piston 67 has a claw member 75 fixed to its lower end by means of a pinch bolt 76. Claws 77 and 78 reach respectively above and below the free end of bar 72 and adjusting screws 79 and 80 enable adjustment to be made of the relative positions of the pistons 67 and 68 at which further motion is arrested, on the one hand by the tip of screw 79 making contact with the upper surface of bar 72 and on the other hand by the tip of screw 80 making contact with the lower surface of bar 72.

As equalisation motions on the part of thrust receiving ring 37 or relative equalising motion of thrust receiving rings 37 and 53, are accommodated by piston 67 and 68 moving together either upwards or downwards, these movements do not affect and are not affected by the relative positions of bar 72 and screws 78 and 80 when they make contact at either end of the permitted range of relative movements, of pistons 68 and 67, made in the course of changes of ratio of the transmission unit as a whole.

I claim:

1. A variable ratio transmission unit having two sets of rollers, each set providing a driving connection between a pair of facing toroidal surfaces on coaxial discs, each surface of one pair of surfaces being coupled to rotate with a surface of the other pair, so that the said two pairs of surfaces and the sets of rollers respectively engaging them are operationally in parallel for the transmission of torque through the transmission unit, a mounting for each roller defining rolling axis about which the roller rotates for the transmission of torque from one disc to another and a precessional axis about which the mounting rotates to change the diameters of the toroidal surfaces at which they are engaged by the roller, to change the transmission ratio, the mounting having freedom of motion in a further mode permitting the rolling axis to move from a stable equilibrium attitude wherein the rolling axis intersects the main axis about which the discs rotate into an attitude in which the rolling axis does not intersect the main axis so that the roller steers itself along a helical path on the discs and changes ratio in the process, the said mounting being urged to move in the second mode by the torque reaction to which it is subjected by the driving action of the roller, a common thrust receiving member for each set of rollers having spaced apart thrust receiving points and a coupling from the mounting of each roller of the set to one of such points the common thrust receiving points being disposed about the main axis so that the thrusts due to roller torque reaction tend to rotate the said members and to displace the said members radially when the torque reactions of the rollers of a set are unequal so that equalising ratio changes are imposed upon the rollers characterised in that a first thrust receiving member for one set of rollers is mounted at one end of a sleeve which extends to the space between the pair of toroidal surfaces engaged by the other set of rollers the sleeve being free to move to a predetermined maximum extent in any direction radial of the main axis at either of its ends, the end of the sleeve remote from the first thrust receiving member being furnished with a first radially extending lever, a second thrust receiving member, for the other set of rollers, journalled on the sleeve in the vicinity of the first lever so as to be freely rotatable thereon but without freedom in relation to the sleeve radial of the main axis, a second radially extending lever, fixed to the second thrust receiving member, and extending in a direction diametrically opposite (releative to the main axis) to the direction in which the first lever extends the first lever and the second lever having outer connection points at equal distances from the main axis and in a line normally intersecting the main axis with means for exerting equal and opposite forces upon the said outer connection points in directions substantially normal to the said line, which forces are equal as between the first lever and the second lever but which means do not restrain movement of the two outer connection points in the same direction in any direction radial of the main axis.

2. A variable ratio transmission unit as claimed in claim 1 in which the said means for applying the said forces to the said outer connection points of the said levers to take the form of two double-acting fluid pressure operated actuators each aligned substantially tangentially, at one of the said outer connecting points, to a circle centred on or close to the main axis and intersecting the said outer connection points, a universally swingable link connecting each actuator to one of the said outer connecting points, two fluid conduits connected respectively to the side of a first one of the actuators nearest to the outer connecting point to which it is connected and also to the side of the second one of the said actuators remote from the outer connecting point to which it is connected, and vice versa, one of such fluid conduits at any one time being connected to a source of control pressure and the other to a source of lower pressure.

3. A variable ratio transmission unit as claimed in claim 2 with a damping element inserted in at least one of the said fluid conduits and adapted to damp the passage of fluid from one to the other of the said actuators but to leave undamped the flow to and from both the said actuators together.

4. A variable ratio transmission unit as claimed in claim 3 in which the damping element has three chambers, two connected respectively to each of the said actuators and the third to the said fluid conduit, a floating piston element in the damping element having two piston surfaces of equal area on one of its sides, working in cylinders each of which is connected to one of the actuators and on its other side a single piston surface of an area equal to the sum of the areas of the other two surfaces working in a cylinder connected to the fluid conduit, a passage restrictive to the flow of fluid between the three cylinders, and resilient means lightly biasing the piston element to a position central of its stroke.

5. A variable ratio transmission unit as claimed in claim 2 having positive ratio range limiting means in the form of a limb extending from the movable element of one of the actuators and a limb extending from the movable element of the other of the actuators, part of one of the limbs abutting the other limb short of one extreme of the range of differential motion of the two actuators and part of one of the limbs abutting the other limb short of the other extreme of the range of differential motion of the two actuators so that when either of these abutments have occurred both actuators are capable of a small amount of residual motion in the same direction.

6. A variable ratio transmission unit as claimed in claim 1 in which radial motions of the second thrust receiving member are damped by three fluid filled viscous dampers respectively coupled between spaced-apart points on the second thrust receiving member and a fixed part of the transmission unit.

7. A variable ratio transmission unit as claimed in claim 6 in which radial motions of the first thrust receiving member are damped by three fluid filled viscous dampers respectively coupled between spaced-apart points on the first thrust receiving member and a fixed part of the transmission unit.

8. A variable ratio transmission unit as claimed in claim 1 in which the said means for applying the said forces to the said outer connection points of the said levers to take the form of two double-acting fluid pressure operated actuators each aligned substantially tangentially, at one of the said outer connecting points, to a circle centred on or close to the main axis and intersecting the said outer connection points, a universally swingable link connecting each actuator to one of the said outer connecting points, two fluid conduits connected respectively to the side of a first one of the actuators nearest to the outer connecting point to which it is connected and also to the side of the second one of the said actuators remote from the outer connecting point to which it is connected, and vice versa, one of such fluid conduits at any one time being connected to a source of control pressure and the other to a source of lower pressure.

No references cited.

FRED C. MATTERN, Jr., *Primary Examiner.*

JAMES A. WONG, *Assistant Examiner.*